(12) United States Patent
Tang et al.

(10) Patent No.: US 12,513,038 B1
(45) Date of Patent: Dec. 30, 2025

(54) DETERMINING FREQUENCY OFFSET OF SIGNAL UNDER TEST

(71) Applicant: Keysight Technologies, Inc., Santa Rosa, CA (US)

(72) Inventors: Wei Tang, Beijing (CN); Rui Zhu, Beijing (CN); Xingchen Duan, Beijing (CN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 4 days.

(21) Appl. No.: 18/764,472

(22) Filed: Jul. 5, 2024

(51) Int. Cl.
*H04L 27/26* (2006.01)
*H04L 27/00* (2006.01)

(52) U.S. Cl.
CPC ........ *H04L 27/266* (2013.01); *H04L 27/0014* (2013.01); *H04L 2027/0026* (2013.01)

(58) Field of Classification Search
CPC ............... H04L 27/266; H04L 27/0014; H04L 2027/0026
See application file for complete search history.

(56) References Cited

U.S. PATENT DOCUMENTS

| | | | |
|---|---|---|---|
| 9,036,723 B2 | 5/2015 | Zhang et al. | |
| 2007/0013583 A1* | 1/2007 | Wang | G01S 19/30 375/150 |
| 2020/0103485 A1* | 4/2020 | Anderson | H04B 17/102 |
| 2020/0153516 A1* | 5/2020 | Gunturi | H04B 17/11 |

FOREIGN PATENT DOCUMENTS

| | | |
|---|---|---|
| CN | 101827052 A | 9/2010 |
| KR | 100698208 B1 | 3/2007 |

OTHER PUBLICATIONS

English translation of KR100698208B1, 7 pgs.
English translation of CN101827052A, 8 pgs.

* cited by examiner

*Primary Examiner* — Sung S Ahn

(57) ABSTRACT

To estimate the frequency offset of time domain multi-tone base-band in-phase and quadrature (IQ) data signal, an initial frequency offset is estimated based on a partial frequency-bin offset estimation in the time domain. The estimated initial frequency offset is compensated, and a resultant compensated signal is transformed to the frequency domain. A remaining frequency offset of the compensated signal in the frequency domain is an integer number of unit spacings of a reference multi-tone signal. To determine that number, cross-correlating the magnitudes of the compensated signal in the frequency domain and tones of the reference multi-tone signal is carried out for each of shifted positions of the compensated signal in the frequency domain relative to the reference multi-tone signal to determine a shifted position having a peak cross-correlation, where the shifted position relative to an original position constituting an integer number of frequency-bin offsets.

20 Claims, 9 Drawing Sheets

$$\text{ESTIMATIONSUM}(\kappa) = \sum_{i=0}^{\text{BLOCKSIZE}-1} A_\kappa(i) \cdot B_\kappa(i)^*$$

$$\text{REFESTIMATESUM}(\kappa) = \sum_{i=0}^{\text{BLOCKSIZE}-1} |A_\kappa(i)|^2$$

⇩

$$\text{FOFFSETESTIMATE} = \frac{1}{\text{CHUNKS}} \sum_{\kappa=0}^{\text{CHUNKS}-1} \frac{\text{ESTIMATIONSUM}(\kappa)}{\text{REFESTIMATESUM}(\kappa)} \quad \text{ODD TONE NUMBERS}$$

$$\text{FOFFSETESTIMATE} = \frac{1}{\text{CHUNKS}} \sum_{\kappa=0}^{\text{CHUNKS}-1} \frac{-\text{ESTIMATIONSUM}(\kappa)}{\text{REFESTIMATESUM}(\kappa)} \quad \text{EVEN TONE NUMBERS}$$

FIG.6

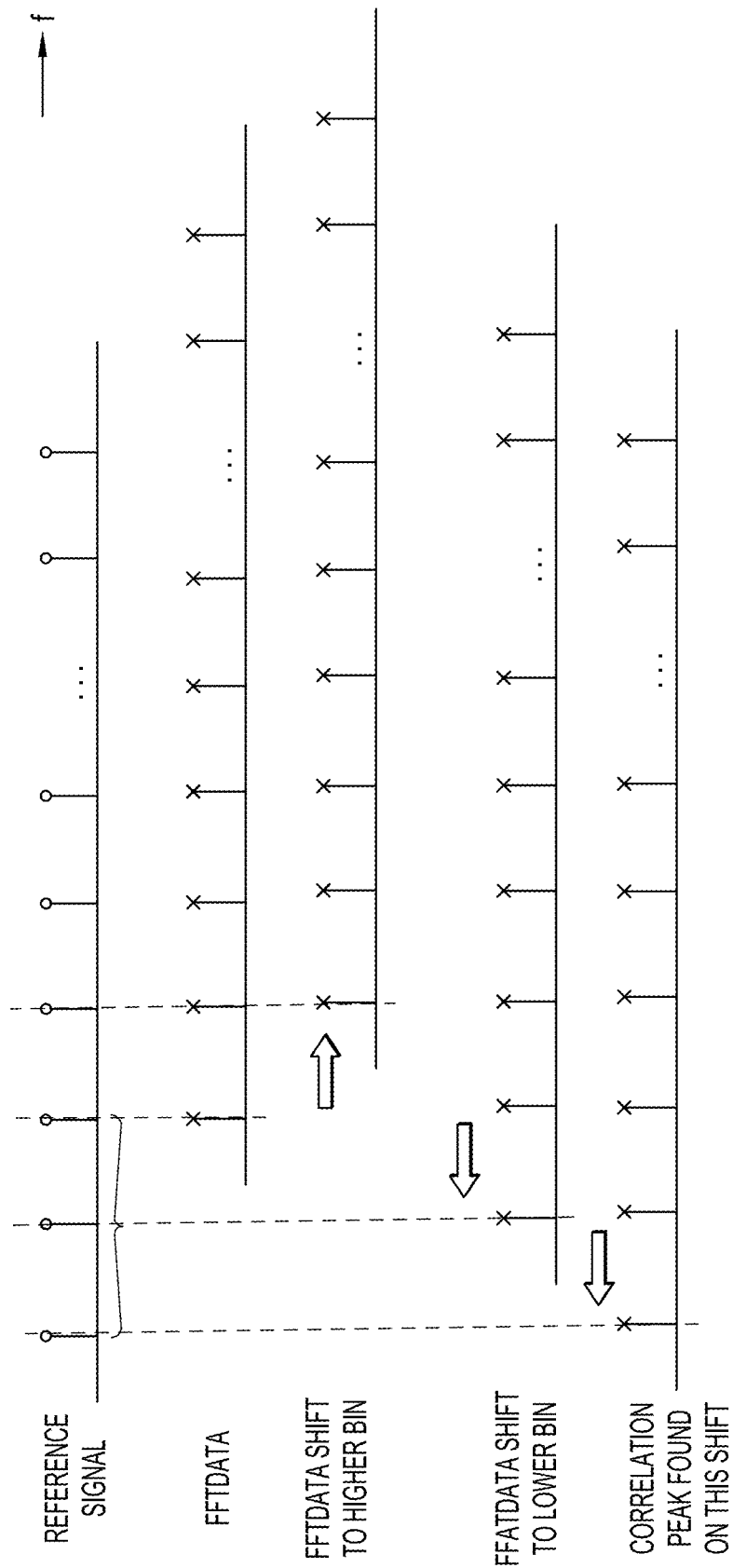

DETERMINING FREQUENCY OFFSET OF SIGNAL UNDER TEST

FIELD

The inventive concepts generally related to the processing of high-speed data signals, and more particularly, to the measurement of frequency offset in high-speed data signals under test (SUTs).

BACKGROUND

In the field of signal processing, frequency offset estimation is a common and integral part of many communication systems. Frequency offset refers to the difference between the expected and actual received signal frequencies. This discrepancy can arise due to various factors such as Doppler shifts, oscillator instabilities, or inaccuracies in the transmitter or receiver.

The estimation of frequency offset is a complex task that depends on various factors such as the characteristics of the signal, the channel conditions, and the receiver architecture. Different algorithms have been developed for frequency offset estimation, each with its own advantages and limitations. However, these algorithms are typically designed for specific types of signals, which is basically a balanced result of many design targets, and may not be applicable or efficient in many instances.

In the meantime, multi-tone signals are widely used for designing and testing of circuit and systems, which have benefits in terms of precise, wideband, high speed, flexibility. For instance, multi-tone signals are used in the communications industry to test for nonlinear distortion for amplifiers, receivers, filters etc. Multi-tone signals are composed of multiple single sine waves or tones with a unique amplitude, phase and frequency. In the spectrum domain, the multi tone or RF energy will be present at a unique frequency. In the time domain, the multiply signals or tones will be a composite signal in which each of the tones will add or cancel to make a composite signal. In most cases, there is an equal tone spacing between any two adjacent tones.

In measurements utilizing multi-tone signals, the practical frequency offset range can be smaller than the tone spacing size (between two adjacent tones), and it can also be larger than one or multiple tone spacing sizes in the multi-tone signal being used. One such method is the Fractional Carrier Frequency Offset (CFO) estimation method. This method is limited in that the frequency offset estimation and correction are restricted to be within half the size of a tone spacing. For larger frequency offsets, a tone spacing has to be increased accordingly, which may not be feasible in all cases. Furthermore, to adjust the tone spacing to measure the frequency error, the frequency error has to be known in advance, which is not practical in many situations.

SUMMARY

According to an aspect of the inventive concepts, a method of processing a base-band in-phase and quadrature (IQ) data signal is provided. The method includes receiving the base-band IQ data signal, receiving data indicative of a reference multi-tone signal, and estimating an initial frequency offset based on the received signals, wherein the initial frequency offset estimation is based on a partial frequency-bin offset estimation in the time domain. The method further includes compensating for the estimated initial frequency offset, and transforming a resultant compensated signal to the frequency domain, wherein a remaining frequency offset of the compensated signal in the frequency domain is an integer number of unit spacings of the reference multi-tone signal. The method still further includes cross-correlating the magnitudes of the compensated signal in the frequency domain and tones of the reference multi-tone signal for each of shifted positions of the compensated signal in the frequency domain relative to the reference multi-tone signal to determine a shifted position having a peak cross-correlation, where the shifted position relative to an original position constituting an integer number of frequency-bin offsets. The method further includes determining the frequency offset of the base-band IQ signal as the sum of the partial frequency-bin offset and the integer number of frequency-bin offsets.

The partial frequency-bin offset estimation may include organizing the base-band IQ data signal into chunks, each chunk comprising two adjacent blocks of samples, and the partial frequency-bin offset estimation may further include calculating an average frequency offset variable across the chunks to zero out white noise As such, the FFT size of the reference signal in the frequency domain shall be larger than a number of tones of the reference multi-tone signal, and wherein, in an initial position of the cross-correlation, the active tones of reference signal are placed in a center of the block, and zeros are placed in other positions on opposite sides of the tones of the reference multi-tone signal. The center of the block stands for Direct Carrier (DC). In oversampling case, zeros will be inserted as needed. The data indicative of the reference multi-tone signal includes a number of tones, a tone spacing, and an amplitude and phase of each tone.

The shifted positions of the compensated signal in the frequency domain relative to the reference multi-tone signal may be in range of +/−N bins, where N is an integer. N may be programmable. Note that the block size described above and the number of active tones together basically determine the maximum frequency offset that can be estimated, i.e. the number of zeros inserted on either side of central active tones. N should be less than that.

The method may further include compensating the base-band IQ signal for the determined frequency offset, determining a channel frequency response of a device from the compensated base-band IQ signal and the reference signals, and estimating a group delay of the device based on the channel frequency response.

The method may be implemented by software embedded in a signal analyzer.

According to another aspect of the inventive concepts, a system for processing a time domain multi-tone base-band in-phase and quadrature (IQ) data signal is provided. The system includes a processor configured to execute instructions, and a memory coupled to the processor. The memory stores instructions which when executed by the processor cause the processor to estimate an initial frequency offset based on the base-band IQ signal and a reference multi-tone signal, wherein the initial frequency offset estimation is based on a partial frequency-bin offset estimation in the time domain. The instructions which when executed by the processor further cause the processor to compensate for the estimated initial frequency offset, and transform a resultant compensated signal to the frequency domain, wherein a remaining frequency offset of the compensated signal in the frequency domain is an integer number of unit spacings of the reference multi-tone signal. The instructions which when executed by the processor still further cause the processor to cross-correlate the magnitudes of the compensated signal in the frequency domain and the reference multi-tone signal for each of shifted positions of the compensated signal in the frequency domain relative to the reference multi-tone signal to determine a shifted position having a peak cross-correlation, wherein the shifted position relative to an original position constitutes an integer number of frequency-bin offsets. The instructions which when executed by the processor further cause the processor to determine the frequency offset of the base-band IQ signal as the sum of the partial frequency-bin offset and the integer number of frequency-bin offsets.

The partial frequency-bin offset estimation may include organizing the base-band IQ data signal into chunks, each chunk comprising two adjacent blocks of samples. The partial frequency-bin offset estimation may further involve calculating an average frequency offset variable across the chunks to zero out white noise.

An FFT size of the compensated signal in the frequency domain, i.e. block size mentioned above, is larger than a number of tones of the reference multi-tone signal, and wherein, in an initial position of the cross-correlation, the tones are placed in a center of the compensated signal in the frequency domain, and zeros may be placed in other positions on opposite sides of the tones of the reference multi-tone signal. An oversampling may be made which further increase the block size by oversampling ratio.

The shifted positions of the compensated signal in the frequency domain relative to the reference multi-tone signal may be in range of +/−N bins, where N is an integer. N may be programmable.

The instructions when executed by the processor may further cause the processor to compensation the base-band IQ signal for the determined frequency offset, determine a channel frequency response of a device from the compensated base-band IQ signal, and estimate a group delay of the device based on the channel frequency response.

The system may be a signal analyzer.

According to still another aspect of the inventive concepts, a non-transitory computer readable storage medium is provided. The non-transitory computer readable storage medium stores instructions that when executed by a processor cause the processor to acquire a base-band in-phase and quadrature (IQ) data signal and data indicative of a reference multi-tone signal, and to estimate an initial frequency offset based on the acquired signals, wherein the initial frequency offset estimation is based on a partial frequency-bin offset estimation in the time domain. Wherein the instructions when executed by the processor further cause the processor to compensate for the estimated initial frequency offset, and transform a resultant compensated signal to the frequency domain, wherein a remaining frequency offset of the compensated signal in the frequency domain is an integer number of unit spacings of the reference multi-tone signal. Wherein the instructions when executed by the processor still further cause the processor to cross-correlate the magnitudes of the compensated signal in the frequency domain and tones of the reference multi-tone signal for each of shifted positions of the compensated signal in the frequency domain relative to the reference multi-tone signal to determine a shifted position having a peak cross-correlation, the shifted position relative to an original position constituting an integer number of frequency-bin offsets. Wherein the instructions when executed by the processor further cause the processor to determine the frequency offset of the base-band IQ signal as the sum of the partial frequency-bin offset and the integer number of frequency-bin offsets.

The partial frequency-bin offset estimation may include organizing the base-band IQ data signal into chunks, each chunk comprising two adjacent blocks of samples. The block size is the same as that for reference multi-tone signal in frequency domain. The block size is also the FFT size when transforming based-band IQ data signal from time domain to frequency domain.

BRIEF DESCRIPTION OF DRAWINGS

The above and other aspects and features of the inventive concepts will become readily apparent from the detailed description that follows, with reference to the accompanying drawings, in which:

FIG. 6 illustrates equations to which the data chunks of FIG. 5 are applied to estimated the initial frequency offset according to embodiments of the inventive concepts;

FIG. 9 demonstrates a block diagram illustrating the process of frequency offset estimation using multi-tone signals, according to aspects of the present disclosure.

DETAILED DESCRIPTION

Figure 1:
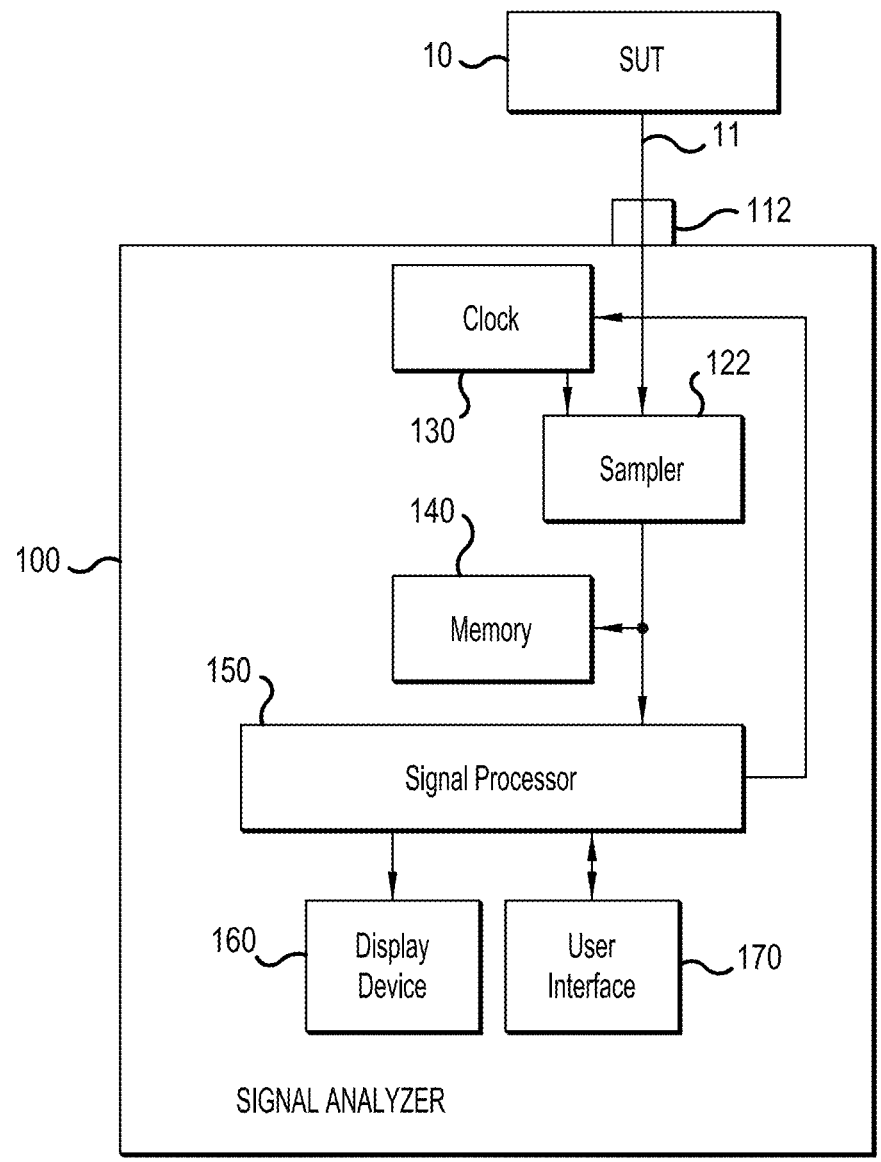
FIG. 1 is a simplified block diagram of a signal analyzer that may be utilized in connection with embodiments of the inventive concepts.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted to avoid obscuring the description of the example embodiments. Such methods and apparatuses are clearly within the scope of the present teachings. Further, throughout the drawings, like reference numbers refer to the same or similar elements.

The terminology used herein is for purposes of describing particular embodiments only, and is not intended to be limiting. The defined terms are in addition to the technical and scientific meanings of the defined terms as commonly understood and accepted in the technical field of the present teachings. As used in the specification and appended claims, the terms 'a', 'an' and 'the' include both singular and plural referents, unless the context clearly dictates otherwise. Thus, for example, 'a device' includes one device and plural devices. Further, for example, when one element is described as being "connected to" another element, the one element may be directly connected to the other element, or indirectly connected to the other element in an operative manner.

Separately, as is traditional in the field of the inventive concepts, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, in the absence of an indication to the contrary, the units and/or modules being implemented by microprocessors or similar may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the example embodiments. Conversely, the blocks, units and/or modules of the example embodiments may be physically combined into more complex blocks, units and/or modules without departing from the scope of the example embodiments.

Signal analyzers are used to characterize high-speed digital data. The present disclosure provides a method, which may be carried out by a signal processor, for estimating the frequency offset of a signal under test (SUT). This method is particularly applicable in the field of signal processing, where accurate frequency offset estimation is paramount for high-quality signal analysis. The disclosed method offers a novel approach to frequency offset estimation, addressing the limitations of existing methods by enabling the estimation of frequency offsets larger than one or multiple tone spacing sizes in a multi-tone signal being used. This is achieved through a combination of time domain and frequency domain signal processing, which allows for a precise frequency offset estimation. The method disclosed herein may be particularly beneficial in scenarios where the frequency offset range can be larger than the tone spacing size in the multi-tone signal used. The method may also be beneficial in situations where the frequency error may come either from a device under test (DUT) itself or from doppler impact in satellite test cases, for example.

FIG. 1 is a simplified block diagram of a signal analyzer 100 that may be used to analyze an SUT 10, including the methods of estimating frequency offset as described herein. The SUT 10 may be processed as a base-band in-phase and quadrature (IQ) data signal, which is a complex signal that contains both amplitude (in-phase) and phase (quadrature) information.

The signal analyzer 100 may include an input port 112 configured to receive the SUT 10 over a signal line 11. The SUT 10 is then processed by a sampler 122, which is configured to capture samples of the received signal. The sampler 122 may include an analog-to-digital converter (not shown) which may be clocked in response to a clock 130 of the signal analyzer 100. In some cases, the clock 130 may be recovered from the captured samples of the signal 11 by any of many clock recovery techniques known to those skilled in the art.

The captured samples of the SUT 10 may be stored in a memory 140. The memory 140 may store therein digitized samples of the SUT captured by sampler 122. In some embodiments, the digitized samples (i.e., the base-band IQ data) may be communicated by the signal analyzer 100 under control of a controller or processor (not shown) via a communications interface (also not shown) to an external device such as a computer where the digitized samples may be processed as described below with respect to a signal processor 150.

The signal processor 150, when executing instructions stored in the memory 140, carries out the methods of estimating frequency offset as describe herein. The working memory storing the instructions can comprise random access memory (RAM), read-only memory (ROM), optical read/write memory, cache memory, magnetic read/write memory, flash memory, and/or any other non-transitory computer readable storage medium.

The signal analyzer 100 may also include a display device 160 and a user interface 170. The display device 160 is not limited to any particular type of display technology, and may include a liquid crystal display (LCD), a plasma display, a cathode ray tube (CRT), or the like, together with the associated processor and software for implementing the display device 160. Likewise, the user interface 170 is also not limited, and may include one or more of a keyboard, a keypad, control knobs, a mouse, a trackball, buttons, indicator lights, and so on, together with the associated processor and software for implementing the user interface 170.

In some aspects, the signal analyzer 100 may include other components and subsystems not illustrated in FIG. 1. These components and subsystems may be configured to perform additional functions related to the processing and analysis of the SUT 10.

Figure 2:
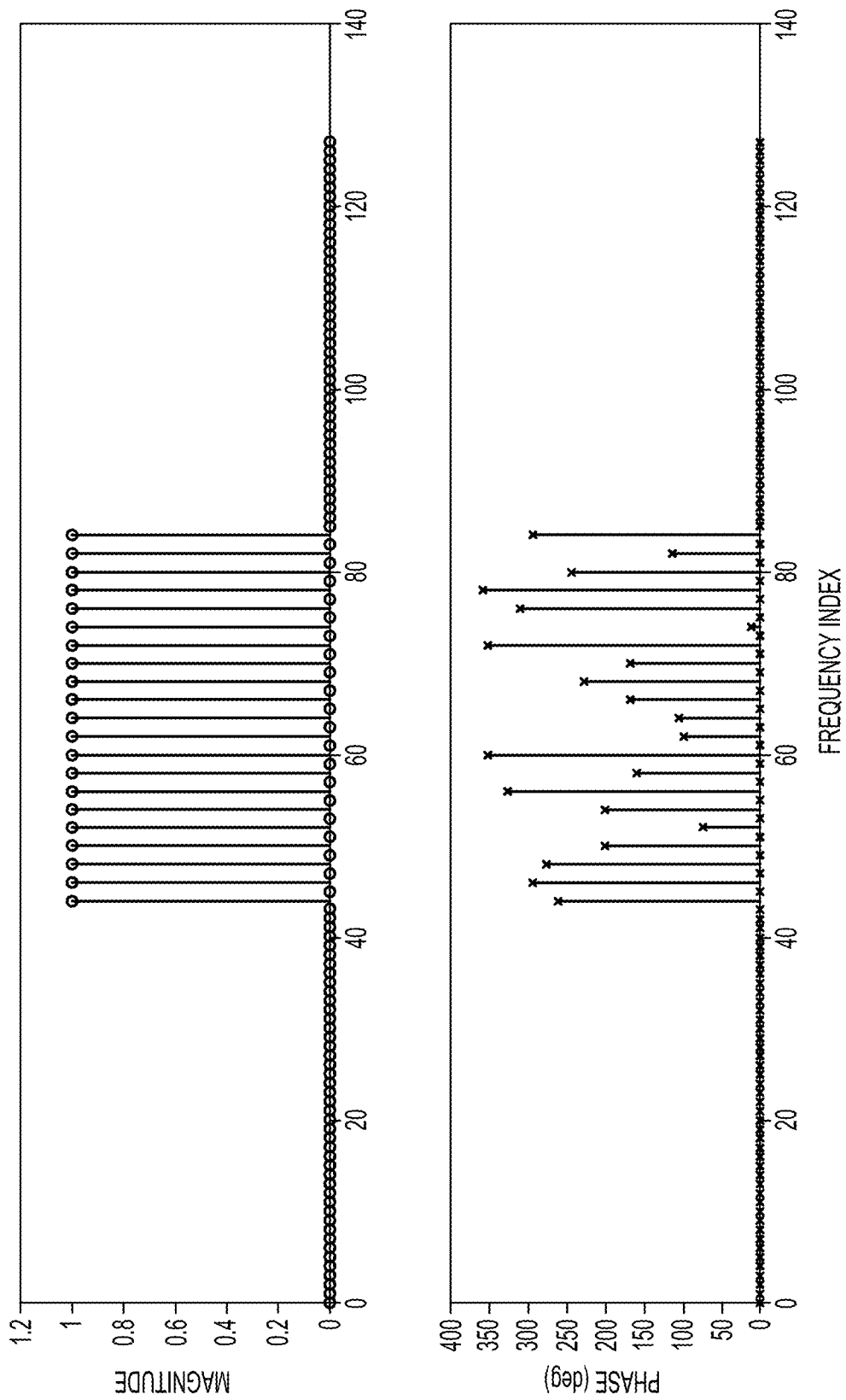
FIG. 2 shows an example of a construction of a reference signal in the frequency domain with 21 active tones and oversampling ratio 2 (a block size is 128 in this case)

In the embodiments that follow, a reference signal block is created based on a reference multi-tone signal, i.e., based on data indicative of a reference multitone signal. FIG. 2 shows an example in which this is done. In the illustrated example, the number of tones is 21. After considering the guard band and round up to the nearest power of 2, a block with 64 samples is obtained. Upon that, oversampling the data by a ratio 2 is carried out, so a block size of 128 is obtained. The block size in FIG. 5 (described later herein) is determined based on this number. The sampling rate for processing the input data can be obtained by the block size before oversampling and the tone spacing.

Figure 3:
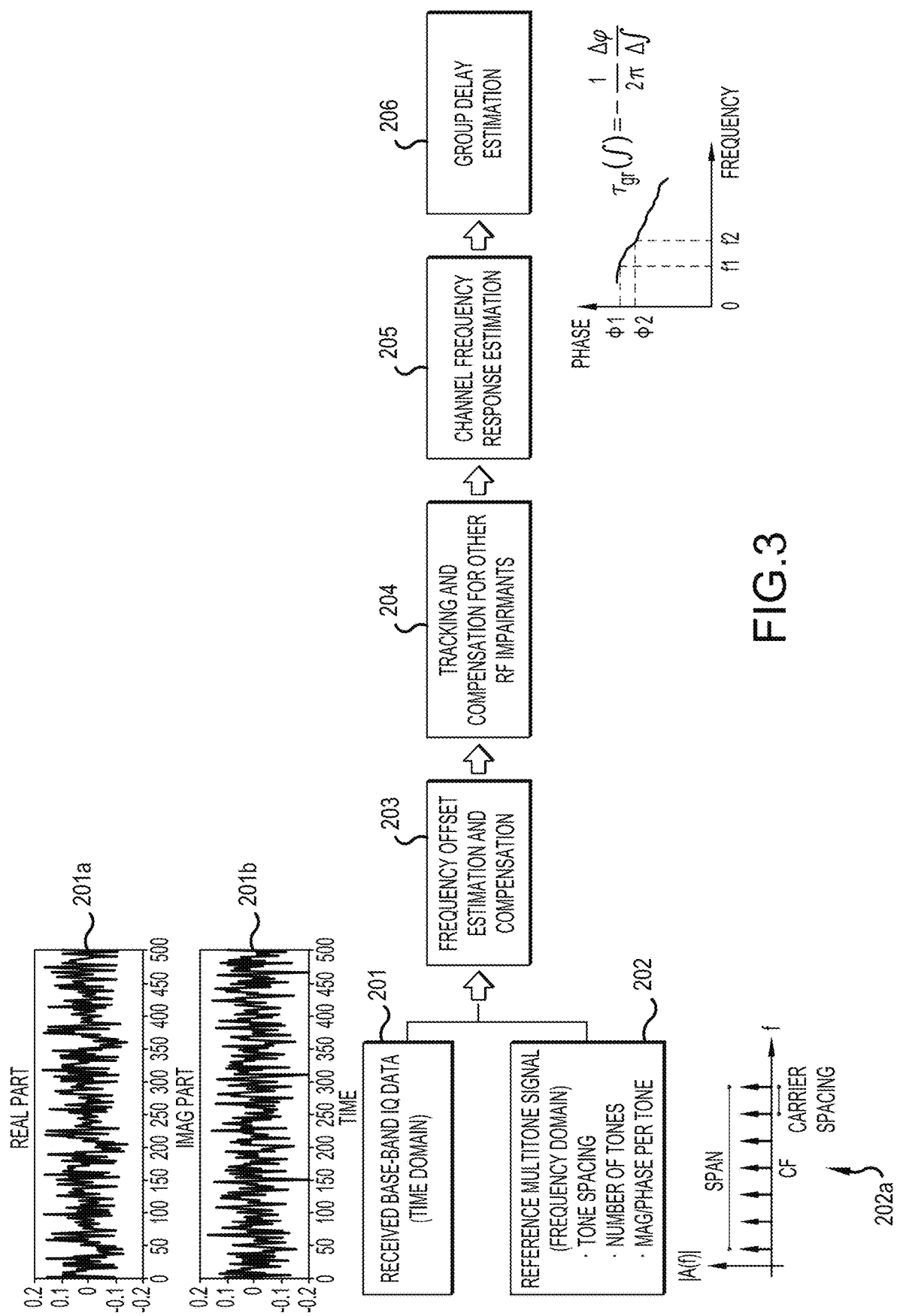
FIG. 3 a block diagram illustrating a signal processing flow for estimating group delay of a signal under test (SUT) according to embodiments of the inventive concepts.

Referring to FIG. 3, a signal processing flow for estimating group delay is depicted. After sampling of the SUT, resultant base-band in-phase and quadrature (IQ) data 201 is obtained that includes real data 201a and imaginary data 201b. This data is processed alongside data indicative of a reference multi-tone signal (Frequency domain) 202. The data indicative of the reference multi-tone signal 202 includes a number of tones, a tone spacing, and an amplitude and phase of each tone. This information is used to emulate a reference multi-tone signal that is used in the frequency offset estimation process.

The Frequency Offset Estimation and compensation Module 203 estimates the frequency offset of the SUT, which include the fractional part and integer number of tone spacing part. This module is the primary focus of the embodiments of the inventive concepts.

The other RF impairments, such as clock error, are then tracked and compensated by the Tracking and Compensation Module 204, and the compensated signal is further processed by the Channel Frequency Response Estimation Module 205 to estimate the channel frequency response.

Finally, the Group Delay Estimation Module 206 calculates the group delay based on the processed data. The group delay is a measure of the time delay of the signal as it passes through the system.

By accurately estimating and compensating for the frequency offset, the accuracy of the group delay estimation can be improved. As described above, to obtain the group delay, it is necessary to first measure the channel frequency response, which can be obtain by signal processing of the received time domain IQ complex signal and the known reference multitone signal in frequency domain. However, due to the imperfect RF properties and the doppler effect, the received signal will be shifted in frequency. This frequency offset must be removed to accurately compute the channel frequency response, and thus group delay.

According embodiments of the inventive concept, the frequency offset can be compensated for even in cases where the frequency offset is larger than one or more tone spacings of the reference tone signal. The embodiments employ a frequency offset estimation method that is a combination of time domain and frequency domain signal processing.

Figure 4:
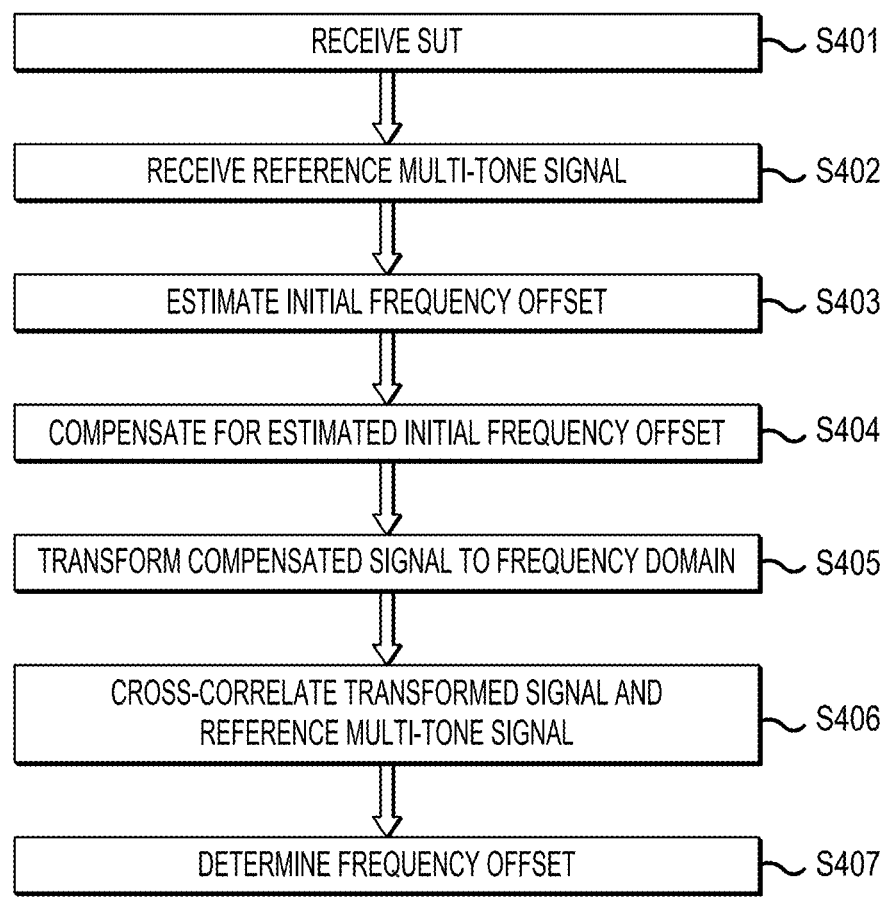
FIG. 4 is a flowchart for reference in describing a method of estimating frequency offset of a SUT according to embodiments of the inventive concepts.

FIG. 4 is a flowchart for reference in describing a method for estimating the frequency offset of a signal under test (SUT) according to embodiments of the inventive concepts.

Initially, the SUT and data indicative of a reference multi-tone signal are received (S401 and S402). The SUT is in the form of base-band in-phase and quadrature (IQ) data. The IQ data may need to be resampled to be aligned with the sampling rate used in the signal analysis process in the signal analyzer. The data indicative of the reference multi-tone signal 202 includes a number of tones, a tone spacing, and an amplitude and phase of each tone.

Next, a partial frequency-bin offset estimation in the time domain is made (S403). That is, an initial frequency offset is estimated based on the acquired base-band IQ data signal and data, where the initial frequency offset estimation is based on a partial frequency-bin offset estimation in the time domain. This is explained below with reference to FIGS. 5 and 6.

Figure 5:
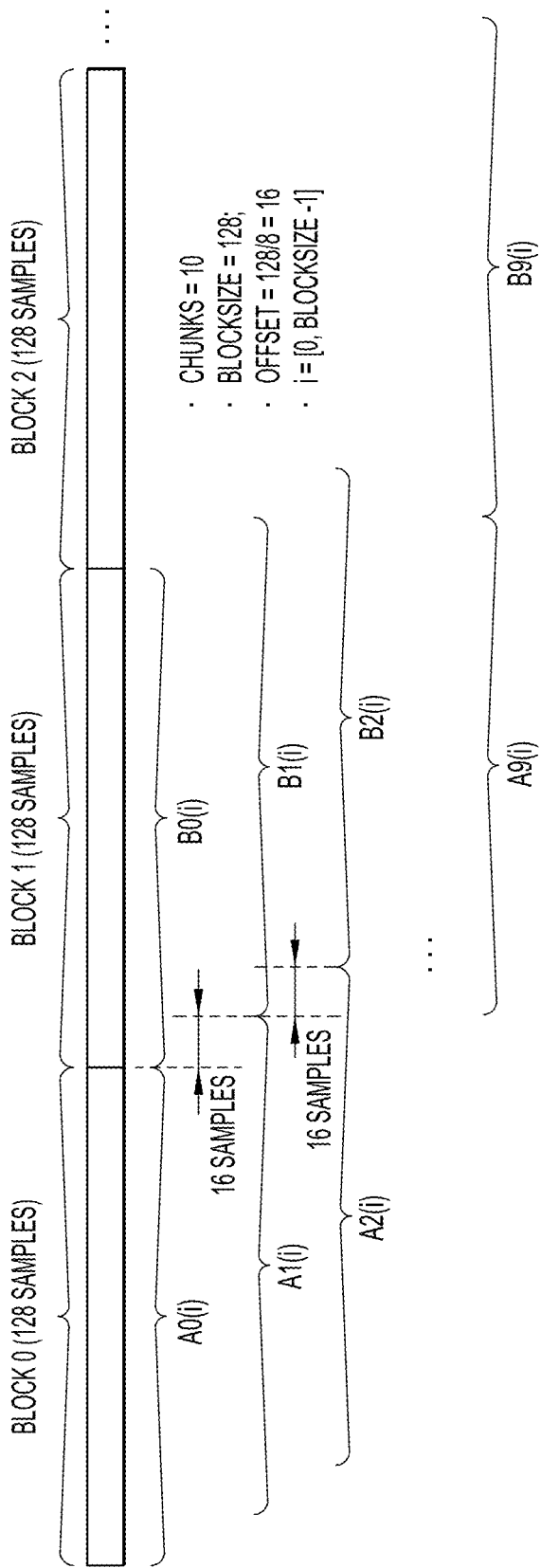
FIG. 5 shows a diagram illustrating the organization of data into chunks for estimation of an initial frequency offset according to embodiments of the inventive concepts.

Referring to FIG. 5, the IQ data is initially organized into chunks. Each chunk includes two adjacent blocks with a block size of 128 samples, for example. The frequency offset estimation is based on samples with an interval equal to the block size. The block size should be selected to be equal to the period of a periodic signal in the time domain. Note that the multitone signal is periodic. Adjacent chunks may overlap or not overlap. In the example of FIG. 5, the chunks are overlapped and the offset is 16 samples. Such chunks can be derived from the whole signal sequence, but it may only be necessary to consider part of all these trunks, In the example, 10 chunks are enough to considered sufficient to achieve a good estimation. Any additional chunks may overburden the calculations.

It is noted there that the block size referred to above for the multi-tone base-band IQ data signal is the same as the block size for the reference signal which is constructed based on the data indicative of the reference multi-tone signal, i.e. number of tones, tone spacing, and an amplitude and phase of each tone.

Next, reference to FIG. 6, the trunks are processed in accordance with the illustrated equations to obtain the average frequency offset variable across chunks for both odd and even tone numbers. In the embodiments described herein, C+ programming is adopted, but the inventive concepts are not limited in this manner.

The offset estimation difference phase across two samples with an interval equal to the block size is then derived as below:

$f$offsetEstimationDiffPhase=$a$ tan 2($f$offsetEstimate.Imag,$f$offsetEstimate.Real)→(range[−π,π])

From this, the difference phase per two adjacent samples is derive by dividing the previous result by block size.

partialfreqBinOffsetInRadsPerSample=−($f$offsetEsstimationDiffPhase/Blocksize)

In this manner as described, a partial frequency-bin offset estimation in the time domain is made.

In some embodiments, the partial frequency-bin offset estimation further includes calculating an average frequency offset variable across the chunks to zero out white noise.

Figure 7:
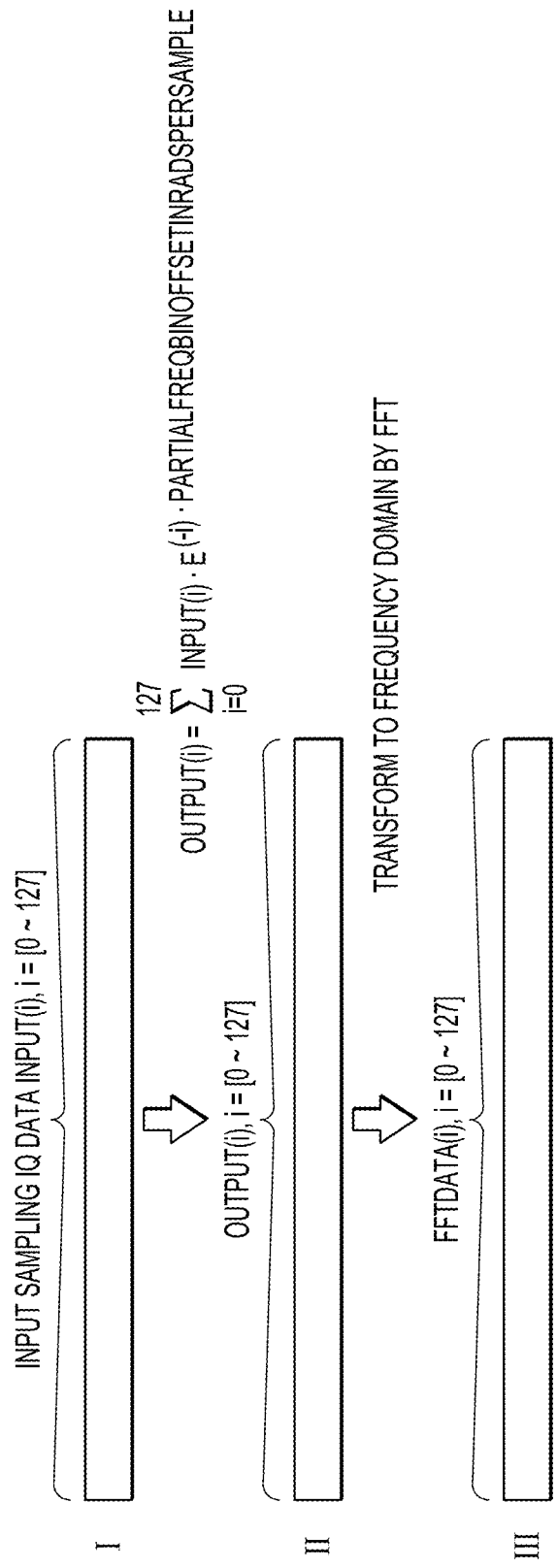
FIG. 7 is a diagram for reference in describing compensating partial frequency-bin offset and transforming the compensated signal to the frequency domain according to embodiments of the inventive concepts.

Next, referring to FIG. 7, the original IQ data signal (I) is compensated (S404 of FIG. 4) for the partial frequency-bin offset determined above. As a result, compensated data signal (II) in the time domain is obtained as shown in FIG. 7. Then, as also shown in FIG. 7, the compensated data (II) is transformed to the frequency domain by FFT (S405 of FIG. 4) to obtain a compensated signal in the frequency domain (III).

Note there that it is only necessary take one segment of data from the original signal, such as 128 samples in this example. Since the multitone signal is a periodic signal, the segment should include at least one period of the signal, whereupon it can include all frequency component information.

Figure 8:
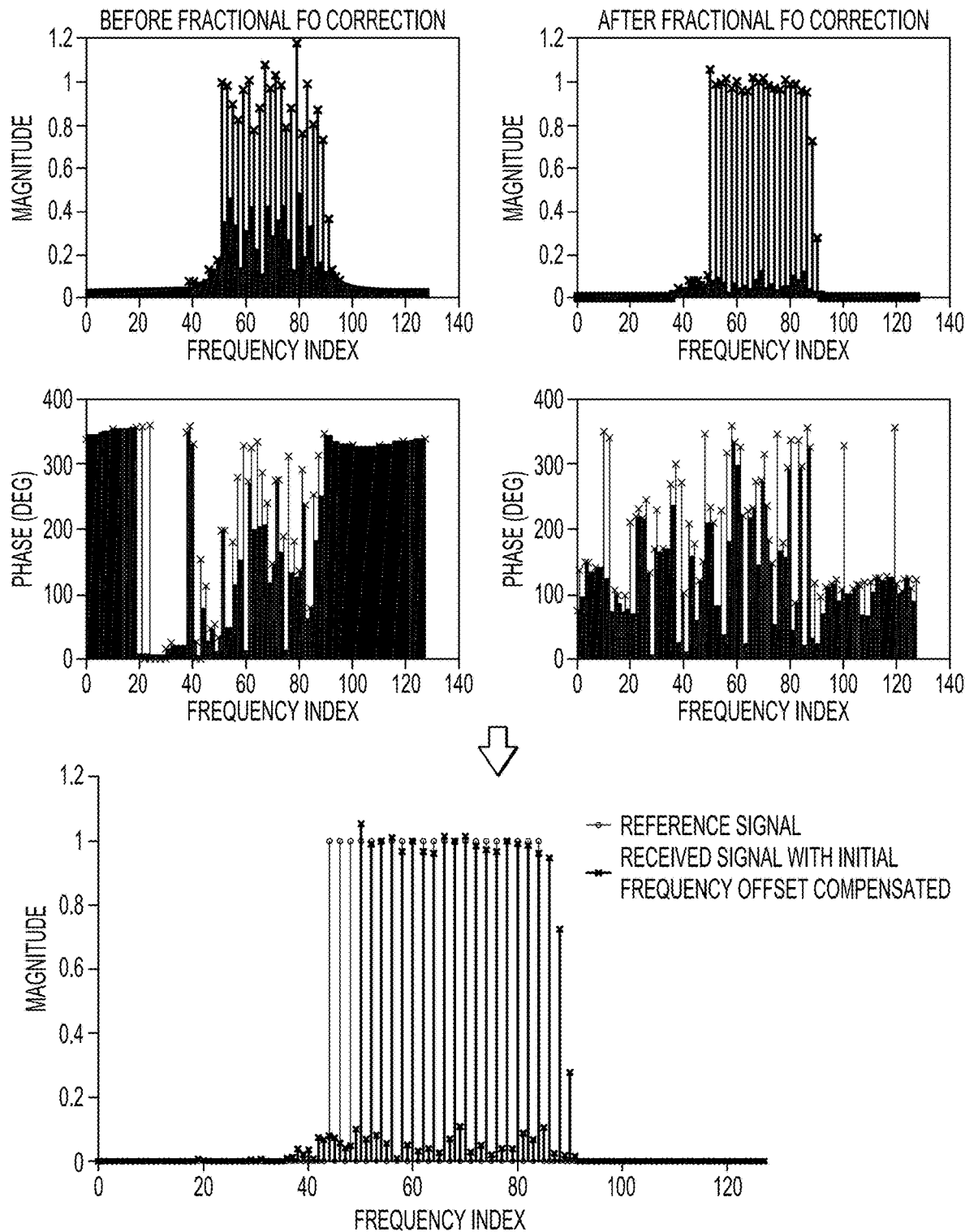
FIG. 8 provides a block diagram illustrating the frequency offset compensation process for a multi-tone signal, according to aspects of the present disclosure.

Referring to FIG. 8, based on the characteristic of multitone signal, the block size is selected to be equal to the number of samples in constructing the reference multi-tone signal, which is also the FFT size in transforming the compensated signal from time domain to frequency domain. The signal in time domain is a periodic signal with the block size being as the period. As a result, we are able to estimate the frequency offset in time domain by checking the phase variation between repeating signal samples with interval of block size.

The actual bandwidth of the signal will be larger than that occupied by the active tones, considering the factors such as the roll off factor in an anti-aliasing low pass filter. In constructing the frequency domain reference multi-tone signal, it is necessary to determine the block size. This was discussed previously in connection with FIG. 2. Firstly, the tone number is multiplied with a factor which corresponds to the roll off factor of a filter as just mentioned. Then, the new number is rounded up to the nearest power of two, so a radix-2 FFT can be made. In addition, in actual signal processing, the reference signal may be oversampled in frequency domain and the block size may be enlarged by the oversampling ratio. With this oversampling processing, the estimation accuracy in the partial frequency-bin offset estimation as above may be improved since the interval between two repeating samples increases.

As such, the FFT size of the reference signal in the frequency domain should be larger than a number of tones of the reference multi-tone signal.

With the partial frequency-bin offset compensated, the remaining frequency offset will be integer number of tone spacings. In the step that follows, this integer number of tone spacings is determined.

Since, as noted above, the remaining frequency offset after S405 is an integer number of tone spacings, the cross-correlation of frequency domain magnitude trace of the measured FFT trace, i.e. fftData (III) of FIG. 7 and the reference signal is calculated (S406 of FIG. 4). This is graphically represented in FIG. 9. The step size for each shift is one bin and the range to check is +/−N bins, where N is an integer. In some embodiments, N is programmable. The selection of N will decide the maximum frequency offset that can be estimated. The offset in bins which has the peak cross-correlation across the range, i.e. +/−N bins, will be found. Note, in practice, oversampling in the frequency domain may be to enhance the resolution, then the range to search will be +/−(N*OverSamplingRatio) bins.

It is noted here that the FFT size of the compensated signal in the frequency domain share be larger than a number of tones of the reference multi-tone signal. In this case, in an initial position of the cross-correlation, the tones are placed in a center of the compensated signal in the frequency domain, and zeros may be placed in other positions on opposite sides of the tones of the reference multi-tone signal.

In addition, since the correlation is on the frequency domain, in a noisy case, as long as the noise floor is below the tones amplitude to some degree, the ability exists to find the correlation peak. Also, some filtering processing may be added to mitigate the noise floor impact in low SNR cases. (Note: In the example, it is assumed that the amplitudes of the tones are the same, which is usually the case in practice. However, the method of the inventive concepts is also valid for signals with un-equal amplitudes across tones.)

If the correlation peak is obtained by a shift of fftData to the lower end bins by K bins, i.e. down-converting frequency to be aligned with the reference signal, the frequency offset is +K*tone-spacing Hz, and vice versa. If this frequency offset is named 'FreqOffsetEstimateInBins', the phase offset for each sample interval in time domain is:

FreqOffsetEstInRadsPerSample=2π·freqOffsetEstimateInBins·
(tones-spacing (in Hz)/oversampling ratio in
frequency domain)/sampling rate Finally, the frequency offset estimation of the SUT is obtained (S407 of FIG. 4) as the sum of the partial frequency-bin offset and the integer number of frequency-bin offsets.

In addition, the process described previously relating to the group delay measurement can be applied to other measurements directly when a multitone signal is used. Noise Power Ratio measurement is another example.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. While representative embodiments are disclosed herein, one of ordinary skill in the art will appreciate that many variations that are in accordance with the present teachings are possible and remain within the scope of the appended claim set. The invention therefore is not to be restricted except within the scope of the appended claims.

What is claimed is:

1. A method of processing a base-band in-phase and quadrature (IQ) data signal, the method comprising:
   acquiring the base-band IQ data signal;
   acquiring data indicative of a reference multi-tone signal;
   estimating an initial frequency offset based on the acquired base-band IQ data signal and data, wherein the initial frequency offset estimation is based on a partial frequency-bin offset estimation in the time domain;
   compensating for the estimated initial frequency offset, and transforming a resultant compensated signal to the frequency domain, wherein a remaining frequency offset of the compensated signal in the frequency domain is an integer number of unit spacings of the reference multi-tone signal;
   cross-correlating the magnitudes of the compensated signal in the frequency domain and tones of the reference multi-tone signal for each of shifted positions of the compensated signal in the frequency domain relative to the reference multi-tone signal to determine a shifted position having a peak cross-correlation, the shifted position relative to an original position constituting an integer number of frequency-bin offsets; and
   determining the frequency offset of the base-band IQ signal as the sum of the partial frequency-bin offset and the integer number of frequency-bin offsets.

2. The method of claim 1, wherein the partial frequency-bin offset estimation includes organizing the base-band IQ data signal into chunks, each chunk comprising two adjacent blocks of samples, wherein a block size of the blocks is same as a FFT size when transforming the compensated signal to the frequency domain, and wherein the block size is also the FFT size used when transferring the signal to frequency domain, which is the same as the constructed reference signal.

3. The method of claim 2, wherein the partial frequency-bin offset estimation further involves calculating an average frequency offset variable across the chunks to zero out white noise.

4. The method of claim 1, wherein a FFT size of the compensated signal in the frequency domain is larger than a number of tones of the reference multi-tone signal, and
   wherein, in an initial position of the cross-correlation, the tones are placed in a center of the reference signal in the frequency domain, and zeros are placed in other positions on opposite sides of the tones of the reference multi-tone signal.

5. The method of claim 4, wherein an initial block size is obtained by adding a guard band to the number of tones of the reference signal, and by rounding up the guard band added number to the nearest power of two.

6. The method of claim 5, further comprising oversampling of the reference signal in frequency domain and inserting additional zeros, wherein the block size increases from the initial block size with an oversampling ratio.

7. The method of claim 4, wherein the data indicative of the reference multi-tone signal includes a number of tones, a tone spacing, and an amplitude and phase of each tone.

8. The method of claim 1, wherein the shifted positions of the compensated signal in the frequency domain relative to the reference multi-tone signal are in range of +/−N bins, where N is a programmable integer.

9. The method of claim 1, wherein the method is implemented by software embedded in a signal analyzer.

10. A system for processing a multi-tone base-band in-phase and quadrature (IQ) data signal in a time domain, the system comprising:
   a processor configured to execute instructions; and
   a memory coupled to the processor, the memory storing instructions which when executed by the processor cause the processor to:
   estimate an initial frequency offset based on the base-band IQ signal in the time domain and the block size for a reference multi-tone signal constructed in a frequency domain, wherein the initial frequency offset estimation is based on a partial frequency-bin offset estimation in the time domain;

compensate for the estimated initial frequency offset, and transform a resultant compensated signal to the frequency domain, wherein a remaining frequency offset of the compensated signal in the frequency domain is an integer number of unit spacings of the reference multi-tone signal;

cross-correlate the magnitudes of the compensated signal in the frequency domain and the reference multi-tone signal for each of shifted positions of the compensated signal in the frequency domain relative to the reference multi-tone signal to determine a shifted position having a peak cross-correlation, the shifted position relative to an original position constituting an integer number of frequency-bin offsets; and determine the frequency offset of the base-band IQ signal as the sum of the partial frequency-bin offset and the integer number of frequency-bin offsets.

11. The system of claim 10, wherein the partial frequency-bin offset estimation includes organizing the base-band IQ data signal into chunks, each chunk comprising two adjacent blocks of samples.

12. The system of claim 9, wherein the partial frequency-bin offset estimation further involves calculating an average frequency offset variable across the chunks to zero out white noise.

13. The system of claim 10, wherein the FFT size of the compensated signal in the frequency domain is larger than a number of tones of the reference multi-tone signal, and
wherein, in an initial position of the cross-correlation, the tones are placed in a center of the compensated signal in the frequency domain, and zeros are placed in other positions on opposite sides of the tones of the reference multi-tone signal.

14. The system of claim 13, wherein the data indicative of the reference multi-tone signal includes a number of tones, a tone spacing, and an amplitude and phase of each tone.

15. The system of claim 10, wherein the shifted positions of the compensated signal in the frequency domain relative to the reference multi-tone signal are in range of +/−N bins, where N is an integer.

16. The system of claim 15, wherein N is programmable.

17. The system of claim 10, wherein the instructions when executed further cause the processor to:
compensate the base-band IQ signal for the determined frequency offset;
determine a channel frequency response of a device from the compensated base-band IQ signal; and
estimate a group delay of the device based on the channel frequency response.

18. The system of claim 8, wherein the system is a signal analyzer.

19. A non-transitory computer readable storage medium storing instructions that when executed by a processor cause the processor to:
acquire a base-band in-phase and quadrature (IQ) data signal;
acquire data indicative of a reference multi-tone signal;
estimating an initial frequency offset based on the acquired IQ data signal and data, wherein the initial frequency offset estimation is based on a partial frequency-bin offset estimation in the time domain;
compensate for the estimated initial frequency offset, and transform a resultant compensated signal to the frequency domain, wherein a remaining frequency offset of the compensated signal in the frequency domain is an integer number of unit spacings of the reference multi-tone signal;
cross-correlate the magnitudes of the compensated signal in the frequency domain and tones of the reference multi-tone signal for each of shifted positions of the compensated signal in the frequency domain relative to the reference multi-tone signal to determine a shifted position having a peak cross-correlation, the shifted position relative to an original position constituting an integer number of frequency-bin offsets; and
determine the frequency offset of the base-band IQ signal as the sum of the partial frequency-bin offset and the integer number of frequency-bin offsets.

20. The non-transitory computer readable storage medium of claim 19, wherein the partial frequency-bin offset estimation includes organizing the base-band IQ data signal into chunks, each chunk comprising two adjacent blocks of samples.

* * * * *